(12) United States Patent
Fujii et al.

(10) Patent No.: US 6,405,151 B1
(45) Date of Patent: Jun. 11, 2002

(54) METHOD OF COMPOSING THREE-DIMENSIONAL MULTI-VIEWPOINTS DATA

(75) Inventors: Eiro Fujii, Takatsuki; Koichi Shiono, Osaka, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/407,771

(22) Filed: Sep. 28, 1999

(30) Foreign Application Priority Data

Oct. 8, 1998 (JP) .......................................... 10-286393

(51) Int. Cl.$^7$ ............................................... G01B 15/00
(52) U.S. Cl. ...................... 702/155; 345/118; 345/119; 345/427; 702/150; 702/152; 702/153
(58) Field of Search ................................ 702/150, 152, 702/153, 155; 345/118, 119, 427

(56) References Cited

U.S. PATENT DOCUMENTS

| | | | |
|---|---|---|---|
| 4,710,876 A | | 12/1987 | Cline et al. .................. 364/414 |
| 5,499,322 A | * | 3/1996 | Thirion et al. ............... 345/418 |
| 5,822,450 A | * | 10/1998 | Arakawa et al. ............. 382/152 |
| 6,151,028 A | * | 11/2000 | Kumagai et al. ............ 345/427 |
| 6,201,881 B1 | * | 2/2001 | Masuda et al. .............. 382/100 |
| 6,256,038 B1 | * | 7/2001 | Krisnamurthy .............. 345/419 |
| 6,285,372 B1 | * | 9/2001 | Cowsar et al. ............... 345/420 |

OTHER PUBLICATIONS

Greg Turk and Marc Levoy, Zippered Polygon Meshes from Range Images, Computer Graphics Proceedings, Annual Conference Series, 1994, pp. 311–318.

Brian Curless and Marc Levoy, A Volumetric Method for Building Complex Models from Range Images, Computer Graphics Proceedings, Annual Conference Series, 1996, pp. 303–312.

William E. Lorensen and Harvey E. Cline, Marching Cubes: A High Resolution 3D Surface Construction Algorithm, Computer Graphics, vol. 21, No. 4, Jul. 1987, pp. 163–169.

* cited by examiner

*Primary Examiner*—Arthur T. Grimley
*Assistant Examiner*—John Le
(74) *Attorney, Agent, or Firm*—Sidley Austin Brown & Wood LLP

(57) ABSTRACT

Based on maximum value of distances between vertexes of polygons in plurality of polygon meshes, size of voxel is determined. Respective potential values for plurality of polygon meshes are obtained on basis of signed respective distances of voxels. Sum of potential values is obtained as added potential value. Polygon mesh made of equivalent face of added potential value is defined as surface mesh. Comparison between surface mesh and plurality of original polygon meshes is performed, to determine respective vertexes of plurality of original meshes corresponding to each vertex of surface mesh. Polygons of surface mesh are divided/synthesized to obtain intermediate surface data. Referring to original polygon meshes, respective vertexes of intermediate surface data are moved. Composed polygon mesh data are obtained with stability even if original three-dimensional data have errors, within practical time, without unnecessarily high redundancy, while maintaining accuracy and resolution of three-dimensional multi-viewpoints data.

14 Claims, 9 Drawing Sheets

METHOD OF COMPOSING THREE-DIMENSIONAL MULTI-VIEWPOINTS DATA

This application is based on application No. 10-286393 filed in Japan, the contents of which are hereby incorporated by reference.

BACKGROUND OF THE INVENTION

1. Field of the Invention

The present invention relates to a technique for composing three-dimensional multi-viewpoints data obtained by measuring a three-dimensional object from a plurality of directions.

2. Description of the Background Art

There are two methods of composing three-dimensional multi-viewpoints data obtained by measuring a three-dimensional object from a plurality of directions, i.e., "polygon-based method" and "volumetric method". Both these methods are used for composing a plurality of original data obtained by measuring an object from a plurality of viewpoints, and the original data are referred to as "polygon mesh data".

Prior to discussion on these methods, polygon mesh data will be discussed. A camera capable of measuring a three-dimensional shape of an object is sequentially set at a plurality of positions of viewpoints. Data obtained by the camera at the viewpoints are converted into range images representing a range from the camera to parts of the object with reference to camera parameter values.

The range image is a set of latticed discrete points, and three-dimensional coordinate value data are defined at each lattice point. In the range image having this data structure, each point is connected to its adjacent four points in four directions by segments, to form a square polygon or a triangular polygon. In each polygon, a direction towards a viewpoint in obtaining a range image is defined as an upward direction. A set of polygons thus obtained is a polygon mesh data. Since the polygon mesh data are obtained for each viewpoint, the number of polygon mesh data is equal to the number of viewpoints.

The polygon-based method will be discussed below. In this method, two of polygon mesh data obtained from a number of viewpoints are sewn together to compose one polygon mesh data. By sewing each pair of adjacent polygon mesh data, all the polygon mesh data are composed, to eventually obtain one composed polygon mesh data.

Two polygon mesh data are composed as below. When polygons in the respective meshes defined by two polygon mesh data are overlapped, one of these polygons is deleted. After that, one of these meshes is clipped on the other.

FIGS. 12 to 14 are illustrations showing a clipping of meshes. In these figures, for explanatory convenience, meshes 31 and 32 are assumed on the same plane. Referring to FIGS. 12 to 14, the clipping of meshes will be discussed below.

First, as shown in FIG. 12, intersections 33 between respective boundaries of the mesh 31 and edges of the mesh 32 are created. With the intersections 33 as boundaries, an unnecessary disposal region 34 as shown in FIG. 13 is deleted, and a set of intersections 33 are connected to vertexes on the boundaries of the mesh 32, to form triangular polygons shared by the meshes 31 and 32. As a result, as shown in FIG. 14, a composed mesh 35 is obtained by composing the meshes 31 and 32.

Thus, clipping of meshes is performed as the boundary of two meshes is zippered to form a new polygon, filling a clearance.

The polygon-based method is disclosed, in detail, for example, in Greg Turk and Mark Levoy, "Zippered Polygon Meshes From Range Images". *Proceedings of ACM SIGGRAPH '94*, pp. 311 to 318. ACM Press, 1994.

Next, the volumetric method will be discussed. In the volumetric method, three-dimensional space is divided into grids of a small unit in x, y and z directions and a small cube of unit grid, i.e., voxel, is used. For example, a rectangular pyramid 21 shown in FIG. 15A is represented by using a number of voxels 22 as shown in FIG. 15B.

With respect to each of the above voxels, a potential value corresponding to a range from a polygon defined by the polygon mesh data to the voxel, is determined. For example, when the voxel 22, a viewpoint 23 and a mesh 24 are positioned as shown in FIG. 16, a potential value is determined on the basis of a distance dx from the voxel 22 on a line of sight 25 to a point x in a polygon 26 of the mesh 24. In such a case, in general, when the voxel 22 is positioned on a side of the viewpoint 23 with respect to the polygon 26, the potential value is negatively signed and when positioned on an opposite side of the viewpoint 23, the value is positively signed. Therefore, in the example of FIG. 16, the potential value is negatively signed.

Since the above calculation of the potential value is executed with respect to a plurality of polygon mesh data obtained from a number of viewpoints, usually, a plurality of potential values are obtained for each voxel. The sum of those potential values is an added potential value for each voxel.

Then, polygon mesh data are generated again by using Marching Cubes algorithm and the like on the basis of the added potential value for each voxel.

The volumetric method is disclosed, in detail, for example, in Brain Curless and Marc Levoy, "A Volumetric Method For Building Complex Models From Range Images". *Computer Graphics*, Annual Conference Series, pp. 303 to 312, 1996 (Proceedings Siggraph '96).

As discussed above, composition of a plurality of polygon mesh data, i.e., original data obtained from a number of viewpoints is conventionally performed by using the polygon-based method or the volumetric method.

Since in the polygon-based method, as discussed above, two of the original polygon mesh data are sequentially composed to eventually obtain one composed polygon mesh data, if any of the original polygon mesh data includes some inaccuracies such as errors, the effect directly appears in the composed polygon mesh data. It is impossible to get rid of these inaccuracies from the composed polygon mesh data.

Further, the composed polygon mesh data are sensitive to errors in the original polygon mesh data and those generated in registration of a plurality of original polygon mesh data on a coordinate system. Especially, such a shape as a thin stick, sensitive to even a small error, cannot be restructured with the composed polygon mesh data.

Furthermore, since it is necessary to reconstruct a segment connecting two points, i.e., a phase every time when two original polygon mesh data are composed, as the multiplicity of the original polygon mesh data, which is in proportion to the number of polygon elements constituting a mesh, becomes larger, a processing efficiency becomes lower.

On the other hand, in the volumetric method, since the sum of a plurality of potential values is the added potential value for each voxel, an error of one original polygon mesh data and that of other data offset each other in many cases, and therefore some inaccuracies of the original polygon mesh data have few effects. As a result, even higher multiplicity of the original mesh data hardly reduces the processing efficiency. In other words, the volumetric method can resolve all the problems of the polygon-based method.

Since the size of voxel is uniform, however, in the volumetric method, the resolution of the eventually-obtained composed polygon mesh data becomes uniform on the whole. Therefore, when the size of voxel is made small in accordance with a portion of high resolution among a plurality of polygon mesh data obtained from a number of viewpoints, the composed polygon mesh data have high redundancy to deteriorate efficiency of calculation. When in accordance with a portion of low resolution, high-resolution data of the original data are lost.

Further, when the potential value is calculated for each voxel, the polygon mesh data are resampled, and when faces of each voxel, i.e., polygons are extracted on the basis of the added potential value, interpolated vertexes are calculated. These two calculations inevitably cause deterioration in accuracy. To maintain the accuracy in the volumetric method, it is necessary to set the size of voxel at a small value, and as mentioned above, that gives the composed polygon mesh data too high redundancy and requires a larger amount of calculation, and is impractical.

SUMMARY OF THE INVENTION

The present invention is directed to a method of composing a plurality of three-dimensional data obtained by measuring an object from a number of viewpoints. The plurality of three-dimensional data define a plurality of original meshes representing a plurality of surface images of said object observed from different directions and/or distances. According to a first aspect of the present invention, the method comprises the steps of: (a) converting the plurality of original meshes into a first surface mesh through a volumetric method; and (b) correcting a mesh structure of the first surface mesh by comparing the first surface mesh with the plurality of original meshes, to thereby obtain a second surface mesh; and (c) correcting a local position of the second surface mesh by comparing the second surface mesh with the plurality of original meshes, to thereby obtain a third surface mesh. In the method of the first aspect, each mesh is defined by a set of polygons, and a composed result of the plurality of three-dimensional data is given by data representing the third surface mesh.

In the method of the first aspect of the present invention, since the first surface data are obtained through the volumetric method using the voxels in the step (a), the first surface data can be obtained with stability even if the plurality of original three-dimensional data have some errors.

Moreover, since the mesh structure and position of the first surface mesh is corrected by referring to relevant parts of the plurality of original meshes, the resolution of the original data can be maintained. As a result, it is not necessary to reduce the size of voxel, causing unnecessarily high redundancy, and therefore it is possible to suppress a time required for the step (a) to a practical level.

Further, a composed result with high accuracy, on which the positional accuracy of the original data is reflected, can be obtained.

In short, by the method of composing the three-dimensional multi-viewpoints data of the first aspect of the present invention, the third surface mesh can be obtained as a composed result with stability even if the original three-dimensional data have some errors within a time of practical level, without unnecessarily high redundancy of the surface data obtained by the step (a), while the accuracy and resolution of the original three-dimensional data obtained from a number of viewpoints are maintained.

According to a second aspect of the present invention, in the method, the step (b) includes the steps of (b-1) sequentially selecting one of vertexes of the first surface mesh as a first objective vertex; (b-2) selecting a reference mesh from the plurality of original meshes with respect to the first objective vertex; and (b-3) correcting a structure of the first surface mesh surrounding the first objective vertex according to a resolution of the reference mesh, to obtain the second surface mesh.

Preferably, the step (b-2) includes the steps of (b-2-1) selecting reference meshes existing within a first threshold distance from the first objective vertex, out of the plurality of original meshes; (b-2-2) determining the highest one of resolutions of the reference meshes as a reference resolution; and (b-2-3) correcting the mesh structure of the first surface mesh surrounding the first objective vertex according to the reference resolution.

In the method of the second aspect of the present invention, it is possible to omit an original mesh that is unnecessarily away from the first objective vertex and is unreliable.

Further, since the highest resolution among the resolutions of the plurality of original meshes is selected, high resolution of the second surface mesh is ensured.

According to a third aspect of the present invention, in the method, the step (c) includes the steps of (c-1) sequentially selecting one of vertexes of the second surface mesh as a second objective vertex; (c-2) selecting a reference portion from the plurality of original meshes with respect to the second objective vertex; and (c-3) correcting a relative position of the second objective vertex with respect to the reference portion, to obtain the third surface mesh.

Preferably, the step (c-2) includes the steps of (c-2-1) selecting mesh elements existing within a second threshold distance from the second objective vertex, out of the plurality of original meshes; and (c-2-2) moving the second objective vertex to reduce a sum of distances from the second objective vertex to the mesh elements.

Since part of the plurality of original meshes whose distance from the second objective vertex is relatively small is referred to, correction is not based on another part that is excessively away from the second objective vertex and unreliable.

Further, since the sum of distances from the second objective vertex to the mesh elements is reduced, a composed result with high accuracy on which the shape of the original three-dimensional data is most reflected can be obtained.

Preferably, the step (c-2-2) includes the step of moving the second objective vertex to minimize the sum of distances from the second objective vertex to the mesh elements.

Preferably, the step (c-2-2) includes the step of moving the second objective vertex so that the sum of distances from the second objective vertex to the mesh elements is smaller than a predetermined threshold value.

According to a fourth aspect of the present invention, in the method, the step (c-2-1) includes the step of determining whether or not the plurality of original meshes have a facing polygon which faces to the second objective vertex; adding the facing polygon to the mesh elements when the plurality of original meshes have the facing polygon; and adding a vertex corresponding to the second objective vertex among vertexes of the plurality of original meshes to the mesh elements when the plurality of original meshes have no facing polygon.

The resolution of the composed result can be thereby made closer to that of the selected original mesh.

The present invention is also directed to an apparatus and a computer software product suitable to perform the above method.

An object of the present invention is to obtain composed polygon mesh data with little effect of errors of the original data, within a time of practical level, without unnecessarily high redundancy.

Another object of the present invention is to maintain the accuracy and resolution of the original three-dimensional data obtained from a number of viewpoints in the composed polygon mesh data.

These and other objects, features, aspects and advantages of the present invention will become more apparent from the following detailed description of the present invention when taken in conjunction with the accompanying drawings.

DESCRIPTION OF THE PREFERRED EMBODIMENTS

System Configuration

Figure 1A:
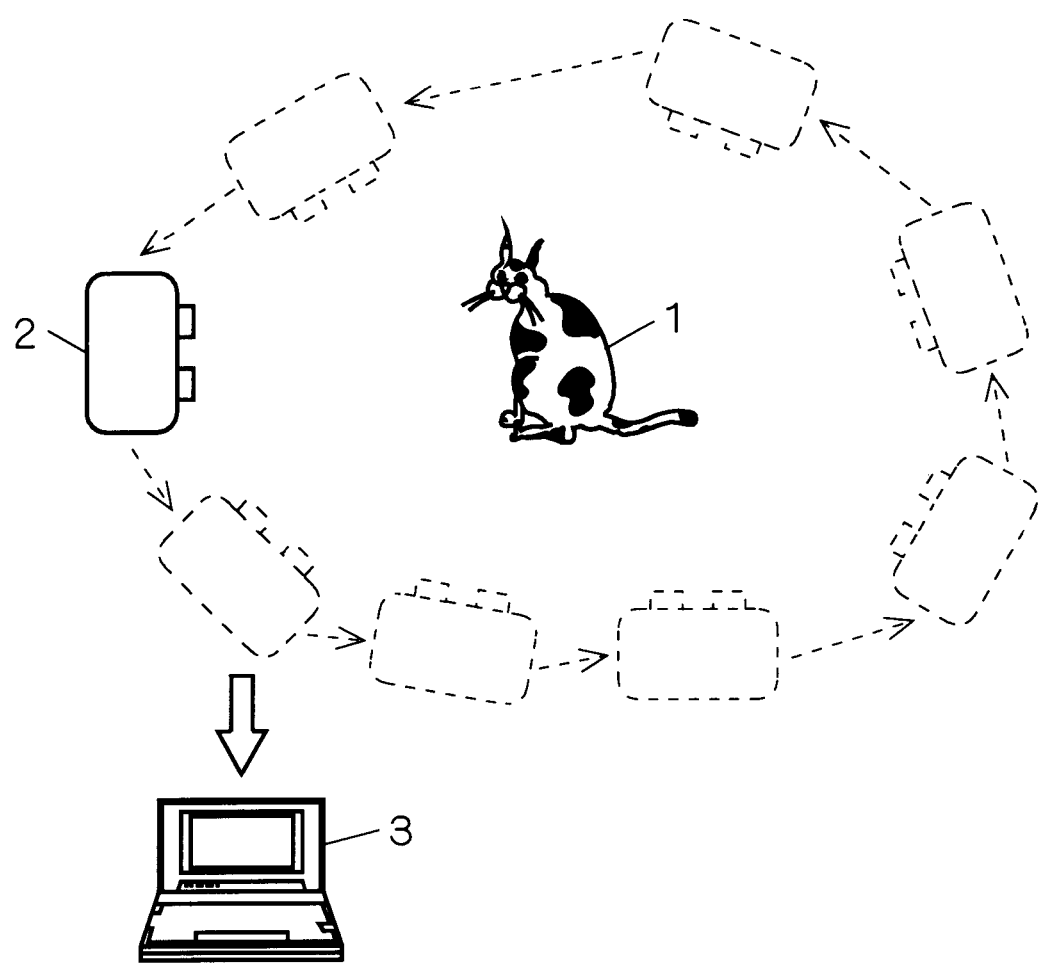
FIG. 1A is a schematic illustration of a hardware configuration of a system used in a preferred embodiment of the present invention.

FIG. 1A is a schematic illustration of a hardware configuration of a system for three-dimensional measurement in accordance with a preferred embodiment of the present invention, and with this system, three-dimensional multi-viewpoints data are synthesized. As shown in FIG. 1A, while a three-dimensional input device 2 is traveled around an object 1, three-dimensional data, i.e., range image of the three-dimensional object 1 are taken from a plurality of viewpoints, by which three-dimensional data are obtained.

The three-dimensional input device 2 comprises zoom lens and can receive three-dimensional data with various resolutions by handling the zoom lens. Further, by changing the distance of the three-dimensional input device 2 from the object 1, the resolution of the three-dimensional data with respect to the object 1 can be changed.

Therefore, when the object 1 is, for example, a person or an animal, for a portion requiring fine data such as a face of the object 1, high-resolution three-dimensional data can be obtained by shortening the distance from the three-dimensional input device 2 to the object 1 or moving the zoom lens towards the side of long focus. On the other hand, for a portion with little variation in shape such as a back of the object 1, low-resolution three-dimensional data in less number can be obtained by lengthening the distance from the three-dimensional input device 2 to the object 1 or moving the zoom lens towards the side of short focus.

Thus, data on a perimeter of the object 1 are inputted with imaging condition adequately changed while the three-dimensional input device 2 is moved. The three-dimensional multi-viewpoints data obtained by the three-dimensional input device 2 are captured into a computer 3 and converted into a plurality of polygon mesh data on the computer 3. This conversion can be performed according to the well-known method of converting polygon mesh data. A plurality of three-dimensional data thus obtained define a plurality of original mesh structures (discussed later in detail) representing surface images of the object 1 viewed from different directions or different distances.

Figure 1B:
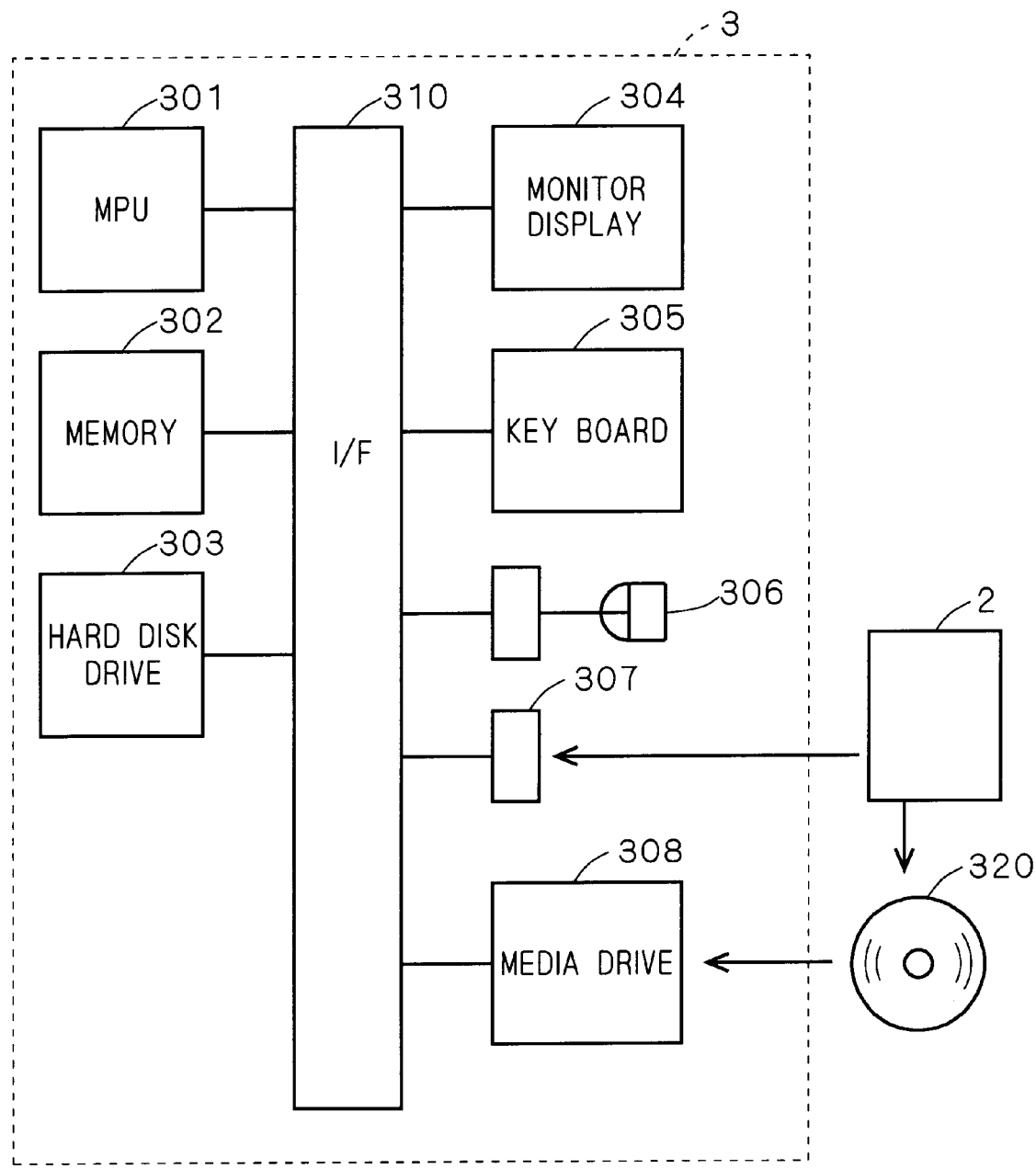
FIG. 1B is a block diagram showing a computer configuration in the system of FIG. 1A.

FIG. 1B shows an internal configuration of the computer 3. The computer 3 includes a MPU 301, a semiconductor memory 302 and a hard disk device 303. These constituent elements 301 to 303 are connected to an interface 310. To the interface 310, a monitor 304, a key-board 305 and a pointing device 306 are connected.

A media drive 308 may include a CD-ROM drive or a DVD drive and a port 307 may include a cable port or an infrared port.

The three-dimensional data obtained by the three-dimensional input device 2 are inputted to the computer 3 through the port 307 or by using a recording medium and the media drive 308.

A portable recording medium 320 stores a software program to implement a later-discussed software process and when installed into the computer 3 through the media drive 308, it makes the computer 3 work as a device for composing the three-dimensional multi-viewpoints data.

This software can be downloaded from a server via network. Further, by using the computer 3 as a terminal, softwares installed on the server can be used.

Method of Synthesizing Three-dimensional Multi-viewpoints Data

Figure 2:
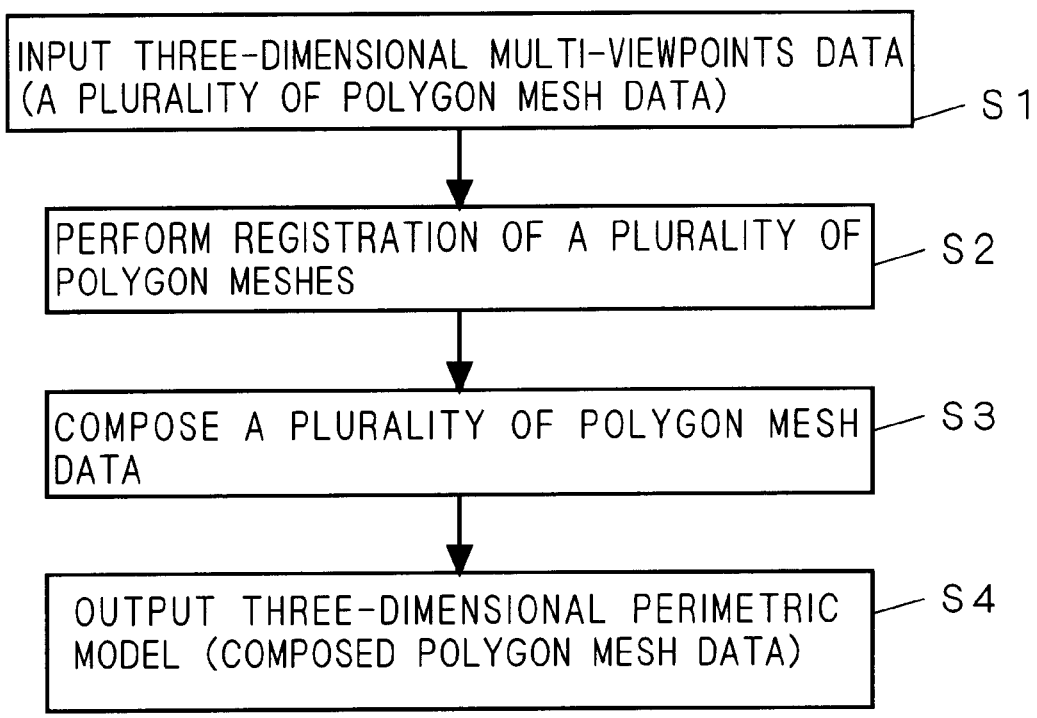
FIG. 2 is a flow chart showing a procedure of a method of synthesizing three-dimensional multi-viewpoints data in accordance with the preferred embodiment of the present invention.

FIG. 2 is a flow chart showing a method of synthesizing three-dimensional multi-viewpoints data in accordance with the preferred embodiment of the present invention.

In the step S1 of FIG. 2, a plurality of original polygon mesh data as three-dimensional multi-viewpoints data are inputted to the computer 3. At this time, each of original polygon mesh data is represented on a coordinate system at each imaging position, i.e., each viewpoint.

Next, in the step S2, the coordinate systems on which a plurality of original polygon mesh data are represented are registered, to convert all the original polygon mesh data into data on one coordinate system. This registration may be achieved by obtaining coordinate-system conversion parameter with a jig such as a rotary table. Instead, an attitude sensor and a position sensor are attached to the three-dimensional input device and a position and an attitude of the three-dimensional input device are obtained, by which the three-dimensional coordinate system can be converted. The coordinate system may be converted by obtaining an optimal conversion parameter with which the original polygon mesh data are most registered, or by other various well-known methods.

Consequently, in the step S3, performing the method of composing the three-dimensional multi-viewpoints data, composed polygon mesh data are obtained by composition such that a plurality of original polygon mesh data registered in the step S2 may become a series of polygon mesh data.

Finally, in the step S4, the composed polygon mesh data obtained in the step S3 are outputted as a three-dimensional model three-dimensionally representing the periphery of the three-dimensional object 1.

Method of Composing Original Data

Figure 3:
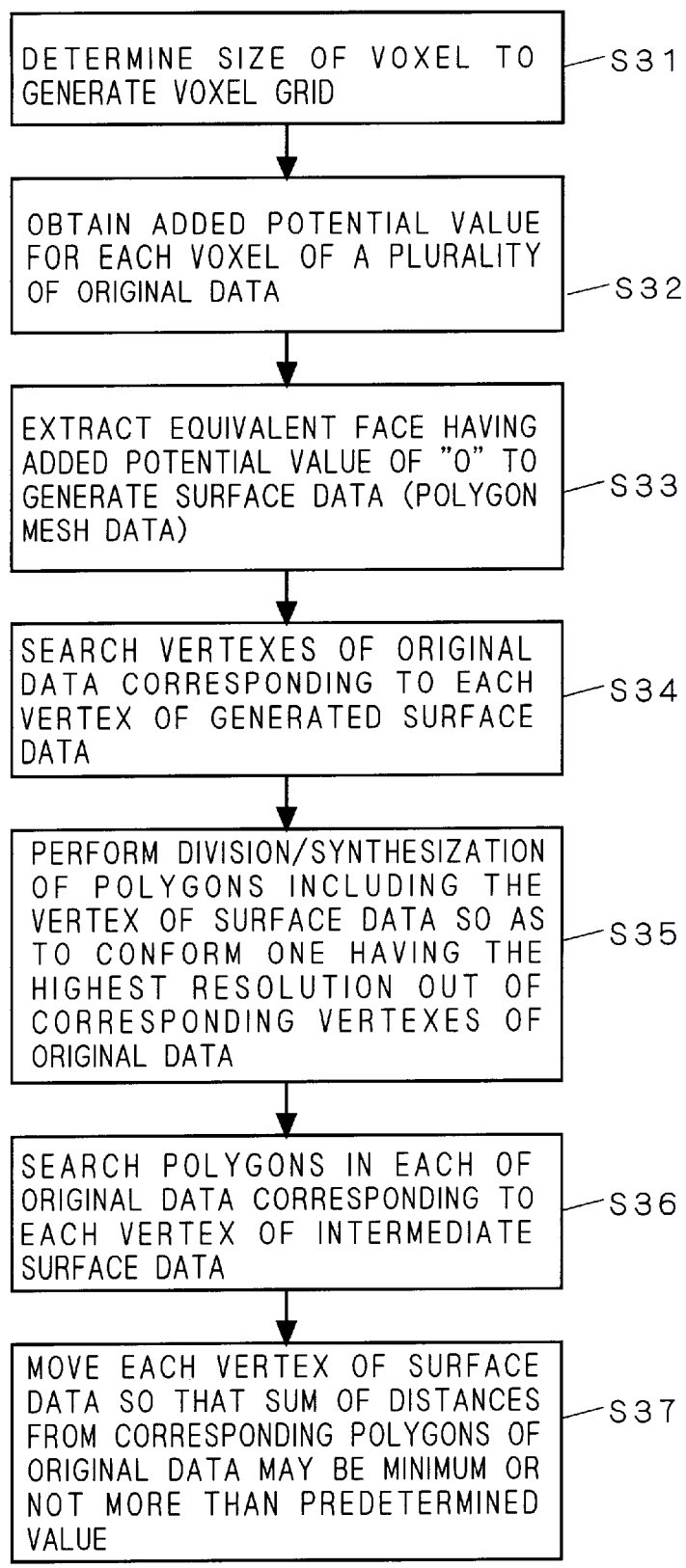
FIG. 3 is a flow chart showing a detailed procedure of composing a plurality of polygon mesh data of FIG. 2.

FIG. 3 is a flow chart showing a detailed method of composing three-dimensional multi-viewpoints data in the step S3 of FIG. 2. The polygon mesh data on which the three-dimensional multi-viewpoints data are based in the step S3 are the original polygon mesh data after registration in the step S2. Hereinafter, the original polygon mesh data after registration are also referred to as "original data" and the mesh represented by the original polygon mesh data is referred to as "original mesh".

Referring to FIG. 3, in the step S31, the maximum value of distances between vertexes of the polygons in a plurality of original meshes is obtained. The size of voxel is determined on the basis of the maximum value, and unit grids (voxel grids) in accordance with the voxel size are generated to obtain a set of voxels.

Figure 16:
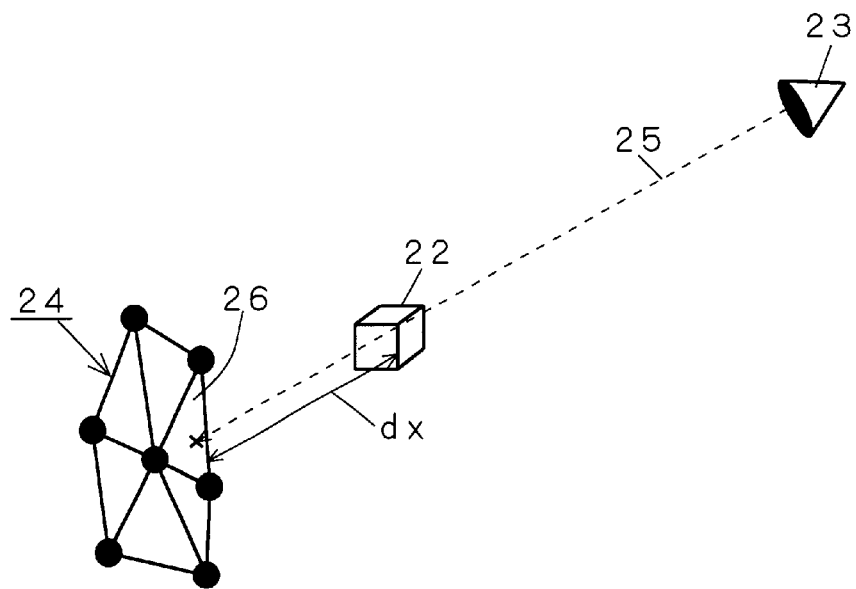
FIG. 16 is an illustration showing an example of signed distance in a volumetric method.

Next, in the step S32, a potential value based on the signed distance of each voxel in a plurality of original meshes is obtained and the potential values for a plurality of original meshes are added to obtain a sum, i.e., an added potential value. The signed distance is obtained, as discussed referring to FIG. 16 on the volumetric method, by calculating a point x on which the line of sight 25 going through a center between the position of the viewpoint 23 and each voxel 22 (only one voxel is shown in FIG. 16) intersects a polygon of one original mesh 24, obtaining an absolute value dx of a distance from the center of the voxel 22 to the intersection x and determining this side of the voxel 22 viewed from the viewpoint 23 as positively signed and that side as negatively signed. On the basis of the signed distance thus obtained, calculation of the potential value is performed.

The above calculation of the potential value is performed for all the plurality of original data. Therefore, at the maximum, the same number of potential values as the original data are obtained for each voxel and a sum of the potential values is the added potential value.

A voxel having an added potential value of "0" (or near "0") is defined as being on a surface of the object 1. In the step S33, equivalent faces having an added potential value of "0" are extracted by Marching Cubes algorithm. By this, surface data are obtained as polygon mesh data corresponding to an equivalent face having the potential value of "0". The Marching Cubes algorithm is disclosed, for example, in W. Lorensen and H. Cline, "Marching cubes: A High Resolution 3D Surface Construction Algorithm", 1987. *Computer Graphics* (SIGGRAPH '87): pp. 163 to 169, July 1987.

The procedures of the steps S31 to S33 can be basically carried out by using the method of composing the polygon mesh data according to the well-known volumetric method, except for determination of voxel size in the step S31.

Therefore, if there are some errors in a plurality of original data themselves, e.g., ones caused by registration in the step S32, stable surface data can be obtained. The mesh defined by the surface data is referred to as "surface mesh".

After that, in the step S34, comparison between the surface mesh obtained in the step S33 and a plurality of original meshes is performed to search vertexes in a plurality of original meshes corresponding to vertexes of polygons in the surface mesh and the searched vertexes are determined as corresponding-vertexes.

Figure 4:
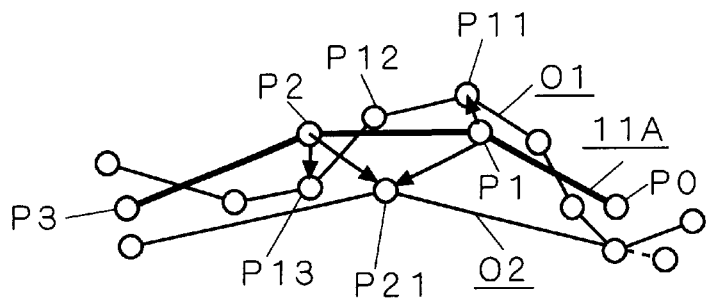
FIG. 4 is an illustration showing an exemplary search for corresponding vertexes of FIG. 3.

For example, as shown in FIG. 4, there is a case where two original meshes O1 and O2 exist and surface mesh 11A is generated. The corresponding-vertex of a vertex P1 of the surface mesh 11A is a vertex P11 of the original mesh O1 and a vertex P21 of the original mesh O2. The corresponding-vertex of a vertex P2 of the surface mesh 11A is a vertex P13 of the original mesh O1 and a vertex P21 of the original mesh O2.

The interval of adjacent vertexes in the original mesh O1 is smaller than that in the surface mesh 11A, and the original mesh O1 is denser than the surface mesh 11A. Therefore, some vertexes (e.g., a vertex P12) of the original mesh O1 do not correspond to any vertex of the surface mesh 11A. On the other hand, the interval of adjacent vertexes in the original mesh O2 is larger than that in the surface mesh 11A, and the original mesh O2 is coarser than the surface mesh 11A. Therefore, some vertexes of the original mesh O2 each correspond to a plurality vertexes of the surface mesh 11A. For example, the vertex P21 corresponds to the vertexes P1 and P2.

FIG. 4 and later-discussed FIG. 5 and FIGS. 8 to 11 represent each polygon mesh as a linear segment chain, for convenience of illustration, each segment represents a polygon having two dimension.

Consequently, in the step S35, vertexes of the surface mesh are sequentially designated as first objective vertexes. Then, out of the respective corresponding-vertexes in a plurality of original meshes corresponding to the first objective vertex, a selected corresponding-vertex is selected through two sub-processes discussed below.

1) The first positional condition Out of the corresponding-vertexes, some whose distance from the first objective vertex is within the first reference value are extracted.

2) The resolution condition

Out of the corresponding-vertexes satisfying the first positional condition, one that has the highest resolution is selected as a selected corresponding-vertex. The condition of highest resolution is equivalent to that of shortest average distance between adjacent vertexes. The original mesh on which the selected corresponding-vertex is defined is referred to as "selected original mesh" and the data defining the selected original mesh are referred to as "selected original mesh data".

Next, to conform to the resolution of the original mesh having the selected corresponding-vertex, the polygon including the first objective vertex is corrected by division or synthesization. By performing division/synthesization of the polygon with all the vertexes of the surface mesh as the first objective vertexes, intermediate surface mesh data representing an intermediate surface mesh 11B can be obtained.

In other words, when the resolution of the selected original mesh data having the selected corresponding-vertex is higher than that of the surface mesh data, the longest segment among segments connected to the first objective vertex is specified and a new dividing vertex is generated on the longest segment, to divide the polygon.

On the other hand, when the resolution of the selected original mesh data having the selected corresponding-vertex is lower than that of the surface mesh data, the shortest segment among segments connected to the first objective vertex is specified and the adjacent vertex across the shortest segment is deleted, to synthesize the polygon.

The above division/synthesization is continued until a resolution difference between the original data having the selected corresponding-vertex and the intermediate surface mesh data falls within a predetermined range.

Figure 5:
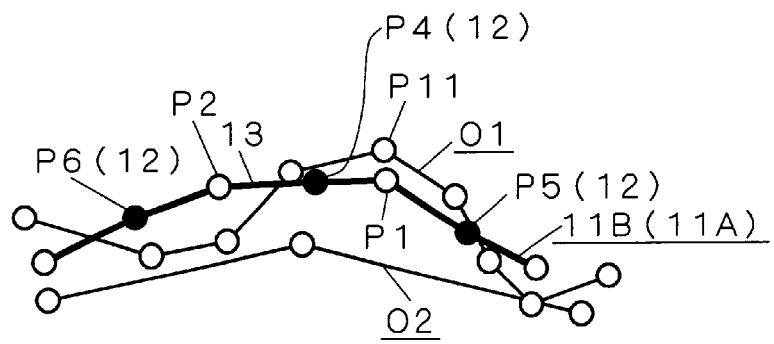
FIGS. 5 to 7 are illustrations showing an exemplary division of polygon of FIG. 3.

FIG. 5 is an illustration showing an exemplary division of polygon in the surface data. This is a case where a selected corresponding-vertex of the vertex P1 of the surface mesh 11A is the vertex P11 of the original mesh O1 as shown in FIG. 5. The resolution of the original mesh O1 is higher than that of the surface mesh 11A. The longest segment among segments extending from the vertex P1 of the surface mesh 11A is a segment 13 connecting the vertexes P1 and P2. Then, a vertex P4 is generated on the segment 13 as a dividing vertex 12.

Figure 6:
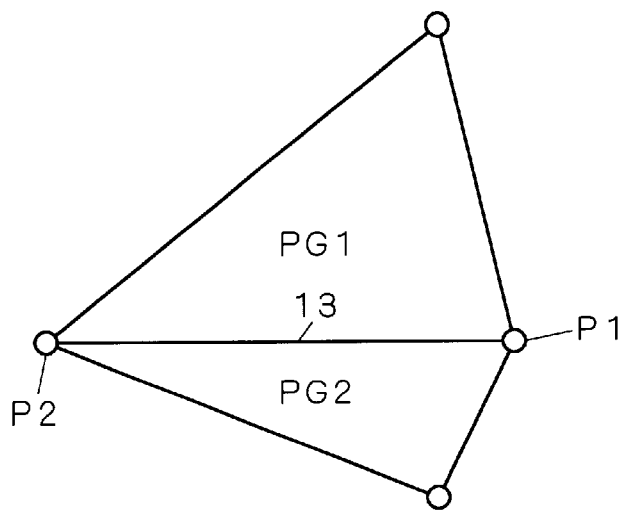
Figure 7:
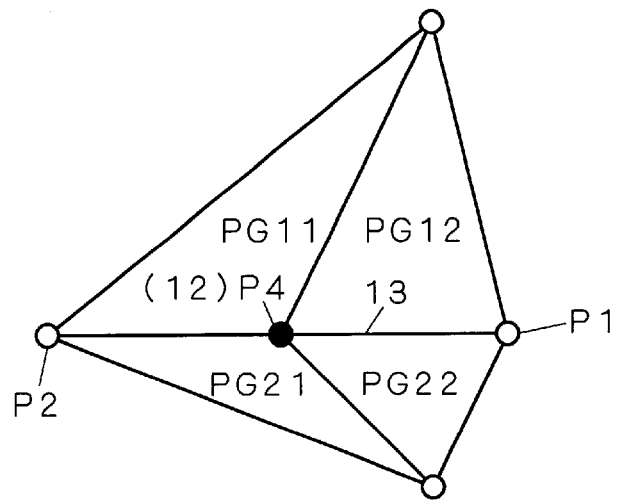

By generating a plurality of new polygons having the vertex P4, the polygon in the surface mesh 11A is divided. For example, when the surface mesh 11A before generating the vertex P4 has a polygon mesh structure having polygons PG1 and PG2 as shown in FIG. 6, the vertex P4 is generated as the dividing vertex 12 as shown in FIG. 7. The polygon PG1 is divided into polygon PG11 and PG12 and the polygon PG2 is divided into polygon PG21 and PG22.

Thus, when the resolution of the selected original mesh is higher than that of the surface mesh, since a new vertex is generated in a region surrounding the first objective vertex to divide the polygon of the surface mesh, the resolution of the surface mesh becomes higher to be closer to that of the selected original mesh. Such a correction of the surface mesh by division of the polygon improves the quality of the surface mesh.

On the other hand, the synthesization is an operation reverse to the division. For example, four polygons as shown in FIG. 7 are synthesized into two polygons as shown in FIG. 6.

Thus, when the resolution of the selected original mesh is lower than that of the surface mesh, since the vertex in a region surrounding the first objective vertex is deleted to synthesize the polygon, an unnecessarily-high resolution of the surface mesh having high redundancy can be closer to a moderate resolution of the selected original mesh. Such a correction of the surface mesh by synthesization of the polygon reduces the number of data of the surface mesh data.

Like division/synthesization of the polygon is performed on all the vertexes of the surface mesh 11A as the first objective vertexes, and consequently, for example, as shown in FIG. 5, the intermediate surface mesh 11B in which the dividing vertexes 12 are generated in a necessary portion can be obtained.

Performing the above steps S34 and S35 produces effects discussed below.

Since only the corresponding-vertex satisfying the positional condition that the distance from the first objective vertex is within the first reference value is selected for procedure, the original mesh in which the corresponding-vertex too far away from the first objective vertex and not reliable is defined is not reflected on the structure of the intermediate surface mesh surrounding the first objective vertex.

Since the mesh structure surrounding the first objective vertex of the surface mesh is corrected in accordance with the mesh having the highest resolution among the original meshes satisfying the first positional condition, an intermediate surface mesh having a resolution almost the same as that of the original mesh can be obtained, regardless of the resolution of the surface mesh obtained in the steps S31 to S33.

Therefore, without making the size of voxel too small in the step S31, intermediate surface mesh data maintaining the resolution of the original mesh can be obtained. As a result, since it is not necessary to enhance the redundancy of the surface mesh data by making the voxel size too small, the time required for the procedures of the steps S31 to S33 can be suppressed to a practical level.

After that, in the step S36, comparison between the intermediate surface mesh and a plurality of original meshes is performed. In this comparison, the vertexes of the polygons in the intermediate surface mesh are sequentially selected. Polygons that are in the shortest distance from the vertex are searched out of a plurality of original meshes and determined as "corresponding polygons".

The procedure of the step S36 will be discussed below. Vertexes on the intermediate surface mesh are sequentially selected as the second objective vertexes and a corresponding-vertex on the original mesh closest to the second objective vertex is searched.

Next, with respect to all the polygons including the corresponding-vertex, a perpendicular is drawn from the second objective vertex onto a virtual plane (hereinafter referred to as "polygon-defined-plane") on which each of the polygons is defined. When an intersection of the perpendicular and the polygon-defined-plane exists within the polygon, the distance from the intersection to the second objective vertex is defined as a vertex-polygon distance. Such a polygon is referred to as "polygon facing to the corresponding vertex" or "facing polygon".

A polygon having the smallest vertex-polygon distance is defined as "corresponding polygon".

Figure 8:
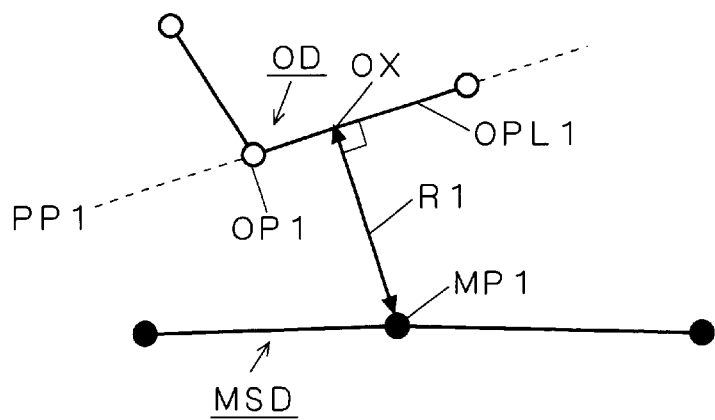
FIGS. 8 to 10 are illustrations showing an exemplary search operation for corresponding polygon of FIG. 3.

This will be discussed referring to FIG. 8. In FIG. 8, for convenience of illustration, polygons are represented by segments. When a vertex MP1 on an intermediate mesh MSD is selected as the second objective vertex, a vertex OP1 on an original mesh OD is defined as the corresponding vertex. An intersection OX of a perpendicular drawn from the vertex MP1 to a polygon-defined-plane PP1 including a polygon OPL1 and the polygon-defined-plane PP1 exists within the polygon OPL1. Therefore, the polygon OPL1 is a facing polygon of the vertex MP1 and a distance R1 between the intersection OX and the vertex MP1 is determined as a vertex-polygon distance. Likewise, vertex-polygon distances are determined with respect to all the polygons including the vertex OP1. If the distance R1 is the minimum value among the vertex-polygon distances, the polygon OPL1 is a corresponding polygon.

With respect to all the polygons including the above corresponding-vertex, when the intersection of perpendicular drawn from the second objective vertex onto the polygon-defined-plane and the polygon-defined-plane do not exist within the polygon, in other words, when there is no facing polygon, the above corresponding-vertex is regarded as the corresponding polygon and the distance between the above vertex and the second objective vertex is determined as the vertex-polygon distance, as an exceptional procedure.

Figure 9:
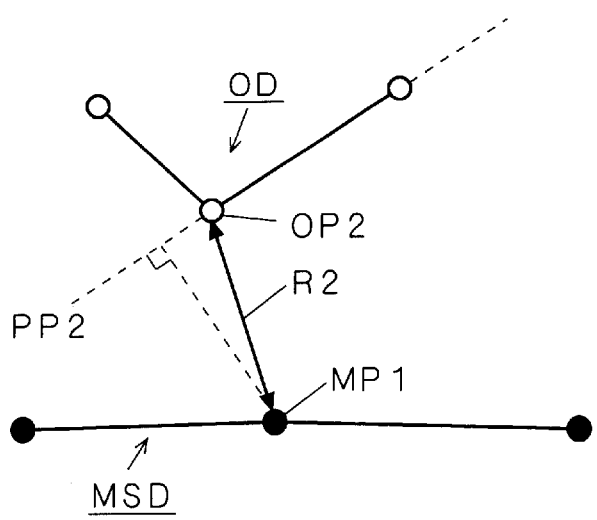

For example, as shown in FIG. 9, if the vertex MP1 on the intermediate surface mesh MSD is determined as the second objective vertex, a vertex OP2 on the original mesh OD is a corresponding-vertex. The intersection between a perpendicular drawn from the vertex MP1 onto a polygon-defined-plane PP2 and the polygon-defined-plane PP2 does not exist within the polygon. Likewise, other polygons including the vertex OP2 have no intersection with the perpendicular drawn from the vertex MP1 within the polygon. Therefore, the vertex MP1 has no facing polygon, and according to the above exceptional procedure, the vertex OP2 is regarded as a corresponding polygon and a distance R2 between the vertexes OP2 and MP1 is determined as a vertex-polygon distance.

Figure 10:
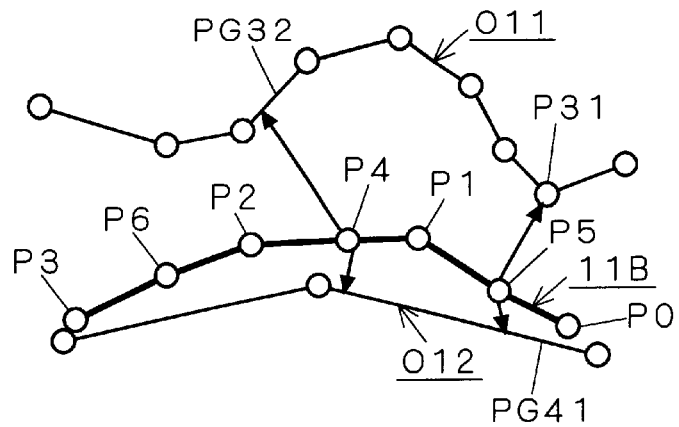

Taking a further example, discussion will be continued. In this example, as shown in FIG. 10, the intermediate surface mesh 11B is generated and two original meshes O11 and O12 exist. A vertex P31 of the original mesh O11 and a polygon PG41 of the original mesh O12 are determined as a corresponding polygon with respect to a vertex P5 of the intermediate surface mesh 11B. Further, a polygon PG32 of the original mesh O11 and the polygon PG41 of the original mesh O12 are determined as a corresponding polygon with respect to the vertex P4 of the intermediate surface mesh 11B.

Finally, in the step S37, the vertexes of the intermediate surface mesh are sequentially assumed to be the second objective vertexes, and among the respective corresponding polygons in a plurality of original meshes corresponding to the second objective vertex, one or a plurality of corresponding polygons satisfying the second positional condition that the vertex-polygon distance is not more than the second reference value are selected. A sum of the vertex-polygon distances between the second objective vertex and the selected corresponding polygons is adopted as a parameter and the position of the second objective vertex is so moved as to satisfy a distance condition that the parameter value is the minimum value or not more than a predetermined threshold value. When only one corresponding polygon is selected, the parameter is the vertex-polygon distance between the one corresponding polygon and the second objective vertex, and the position of the second objective vertex is so moved as to satisfy the condition that the parameter is not more than a threshold value. Such a moving operation is performed on all the vertexes of the intermediate surface mesh as the second objective vertexes, to eventually obtain resultant surface mesh data representing a resultant surface mesh 11C. This moving operation suppresses the inaccuracy in generation of the surface data by composing the original data to the minimum.

Figure 11:
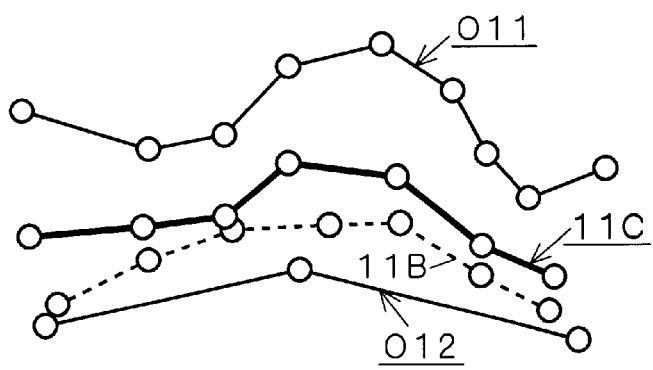
FIG. 11 is an illustration showing an exemplary moving operation of vertexes of an intermediate surface data of FIG. 3.
Figure 12:
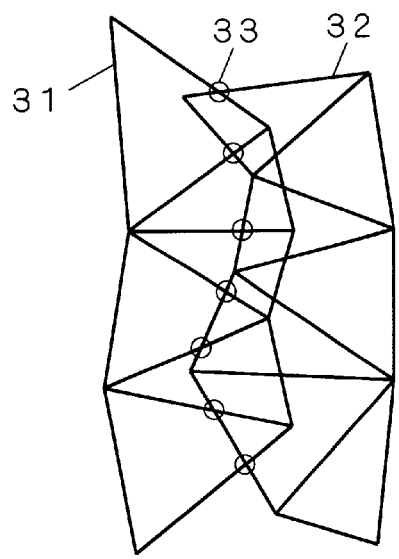
FIGS. 12 to 14 are illustrations showing a clipping of meshes.
Figure 13:
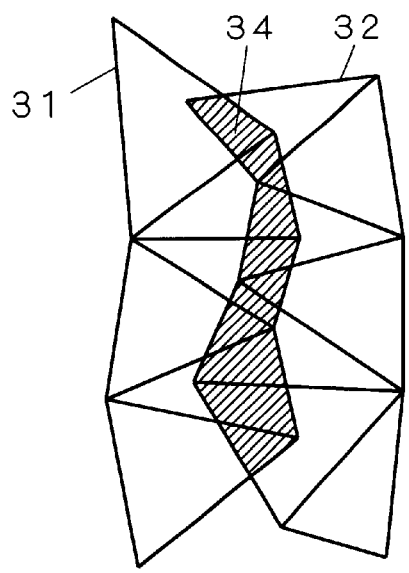
Figure 14:
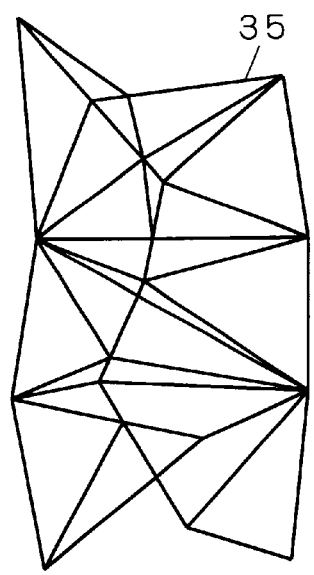
Figure 15A:
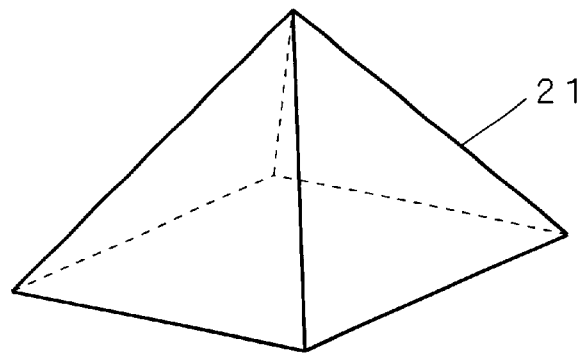
FIGS. 15A and 15B are illustrations of a voxel structure.
Figure 15B:
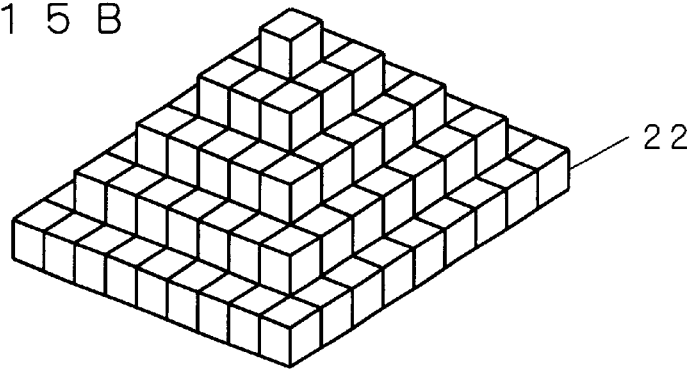

For example, as shown in FIG. 11, even when the intermediate surface mesh 11B is generated to be close to the original mesh O12, through the moving operation in the step S37, this closeness to the original mesh O12 is corrected to obtain the resultant surface mesh 11C.

The procedures of the steps S36 and S37 produce the following effects. Since an original mesh having a corresponding polygon whose vertex-polygon distance from the second objective vertex is less than the second reference value is selected out of a plurality of original meshes defined by the original data, original data having a corresponding polygon whose distance from the second objective vertex is too large, which is unreliable, is not reflected on the correction of the second objective vertex.

A parameter value is defined by the sum of the distances between the respective corresponding polygons in the selected original meshes and the second objective vertex. When the second objective vertex is moved, the parameter value is accordingly changed. The target position of movement of the second objective vertex is so specified as to satisfy the condition that the parameter value is the minimum value or not more than a predetermined threshold value. All the second objective vertexes are so moved as to satisfy the above distance condition, to obtain a resultant surface mesh.

Therefore, since the intermediate surface data are corrected by using the original data, even if the accuracy of the intermediate surface data is deteriorated to some extent, resultant surface data can be obtained with high accuracy reflecting the accuracy of the original data.

Thus, by the method of composing the three-dimensional multi-viewpoints data performed in the step S3, resultant surface data can be obtained with stability even if original data itself have inaccuracy, within a time of practical level, without unnecessarily high redundancy of the surface data obtained in the steps S31 to S33, while maintaining the accuracy and resolution of the original data obtained from a number of viewpoints.

Flexibility for Recording Medium

A software program to implement the method of synthesizing the three-dimensional multi-viewpoints data shown in FIG. 2 can be stored as a computer-readable program in an external recording medium 320 (of FIG. 1B) such as a flexible disk and a CD-ROM. Further, a software program to convert the data obtained by the three-dimensional input device 2 into polygon mesh data can be stored in the same external recording medium 320.

Only a software program to implement a process (the step S3) of composing the three-dimensional multi-viewpoints data shown in detail in FIG. 3 may be stored as a computer-readable program in the external recording medium 320. In this case, a program for performing the steps S1, S2 and S4 can be written into a ROM or a hard disk of the computer 3 in advance. The program for the step S3 is loaded from the external recording medium 320 and cooperates with the program for processing the steps S1, S2 and S4 to perform a series of processing.

Only a software program for performing the steps S34 to S37 may be stored in the external recording medium 320. In this case, a program for performing the steps S1, S2, S31 to S33 and S4 can be written into a ROM or a hard disk of the computer 3 in advance as mentioned above. The program for the steps S34 to S37 is loaded from the external recording medium 320 and cooperates with the program for processing the steps S1, S2, S31 to S33 and S4 to perform a series of processing.

While the invention has been shown and described in detail, the foregoing description is in all aspects illustrative and not restrictive. It is therefore understood that numerous modifications and variations can be devised without departing from the scope of the invention.

What is claimed is:

1. A method of composing a plurality of three-dimensional data obtained by measuring an object from a number of viewpoints, said plurality of three-dimensional data defining a plurality of original meshes representing a plurality of surface images of said object observed from different directions and/or distances, said method comprising the steps of:
   (a) converting said plurality of original meshes into a first surface mesh through a volumetric method; and
   (b) correcting a mesh structure of said first surface mesh by comparing said first surface mesh with said plurality of original meshes, to thereby obtain a second surface mesh; and
   (c) correcting a local position of said second surface mesh by comparing said second surface mesh with said plurality of original meshes, to thereby obtain a third surface mesh,
       wherein each mesh is defined by a set of polygons, and
       a composed result of said plurality of three-dimensional data is given by data representing said third surface mesh.

2. The method according to claim 1, wherein said step (b) includes the steps of
   (b-1) sequentially selecting one of vertexes of said first surface mesh as an objective vertex;
   (b-2) selecting a reference mesh from said plurality of original meshes with respect to said objective vertex; and (b-3) correcting a structure of said first surface mesh surrounding said objective vertex according to a resolution of said reference mesh, to obtain said second surface mesh.

3. The method according to claim 2, wherein
said step (b-2) includes the steps of
  (b-2-1) selecting reference meshes existing within a threshold distance from said objective vertex, out of said plurality of original meshes;
  (b-2-2) determining the highest one of resolutions of said reference meshes as a reference resolution; and
  (b-2-3) correcting said mesh structure of said first surface mesh surrounding said objective vertex according to said reference resolution.

4. The method according to claim 3, wherein
said step (b-2-3) includes the step of
adding a polygon to a portion of said first surface mesh surrounding said objective vertex when said reference resolution is higher than a resolution of said first surface mesh.

5. The method according to claim 3, wherein
said step (b-2-3) includes the step of
deleting a polygon from a portion of said first surface mesh surrounding said objective vertex when said reference resolution is lower than a resolution of said first surface mesh.

6. The method according to claim 1, wherein
said step (c) includes the steps of
  (c-1) sequentially selecting one of vertexes of said second surface mesh as an objective vertex;
  (c-2) selecting a reference portion from said plurality of original meshes with respect to said objective vertex; and
  (c-3) correcting a relative position of said objective vertex with respect to said reference portion, to obtain said third surface mesh.

7. The method according to claim 6, wherein
said step (c-2) includes the steps of
  (c-2-1) selecting mesh elements existing within a threshold distance from said objective vertex, out of said plurality of original meshes; and
  (c-2-2) moving said objective vertex to reduce a sum of distances from said objective vertex to said mesh elements.

8. The method according to claim 7, wherein
said step (c-2-2) includes the step of
moving said objective vertex to minimize said sum of distances from said objective vertex to said mesh elements.

9. The method according to claim 7, wherein
said step (c-2-2) includes the step of
moving said objective vertex so that said sum of distances from said objective vertex to said mesh elements is smaller than a predetermined threshold value.

10. The method according to claim 7, wherein
said step (c-2-1) includes the steps of
determining whether or not said plurality of original meshes have a facing polygon which faces to said objective vertex;
adding said facing polygon to said mesh elements when said plurality of original meshes have said facing polygon; and
adding a vertex corresponding to said objective vertex among vertexes of said plurality of original meshes to said mesh elements when said plurality of original meshes have no facing polygon.

11. The method according to claim 1, wherein
said step (a) includes the steps of
  (a-1) defining a voxel grid;
  (a-2) calculating potentials of voxels for each one of said plurality of original meshes, to obtain a plurality of potential values for each voxel;
  (a-3) composing said plurality of potentials for each voxel, to obtain a composed potential; and
  (a-4) obtaining said first surface mesh on the basis of said composed potential.

12. An apparatus for composing a plurality of three-dimension data obtained by measuring an object from a number of viewpoints, said plurality of three-dimensional data defining a plurality of original meshes representing a plurality of surface images of said object observed from different directions and/or distances, said apparatus comprising:
  (a) a first processing unit for converting said plurality of original meshes into a first surface mesh through a volumetric method;
  (b) a second processing unit for correcting a mesh structure of said first surface mesh by comparing said first surface mesh with said plurality of original meshes, to thereby obtain a second surface mesh; and
  (c) a third processing unit for correcting a local position of said second surface mesh by comparing said second surface mesh with said plurality of original meshes, to thereby obtain a third surface mesh,
  wherein each mesh is defined by a set of polygons, and a composed result of said plurality of three-dimensional data is given by data representing said third surface mesh.

13. The apparatus according to claim 12, wherein
said second processing unit includes
  (b-1) a first sub-processing unit for sequentially selecting one of vertexes of said first surface mesh as an objective vertex;
  (b-2) a second sub-processing unit for selecting a reference mesh from said plurality of original meshes with respect to said objective vertex; and
  (b-3) a third sub-processing unit for correcting a structure of said first surface mesh surrounding said objective vertex according to a resolution of said reference mesh, to obtain said second surface mesh.

14. The apparatus according to claim 12, wherein
said third processing unit includes
  (c-1) a first sub-processing unit for sequentially selecting one of vertexes of said second surface mesh as an objective vertex;
  (c-2) a second sub-processing unit for selecting a reference portion from said plurality of original meshes with respect to said objective vertex; and
  (c-3) a third sub-processing unit for correcting a relative position of said objective vertex with respect to said reference portion, to obtain said third surface mesh.

* * * * *